Figure 1:
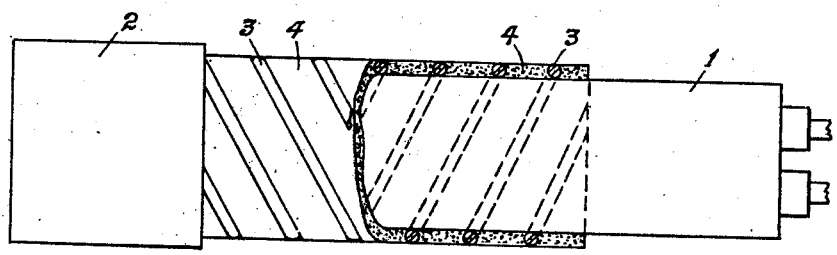

Oct. 22, 1929.  J. L. PACKER  1,732,984
LEAD OR LIKE METAL SHEATHED ELECTRIC CABLE
Filed Aug. 4, 1925  2 Sheets-Sheet 1

Inventor.
J.L. Packer
by
atty.

Oct. 22, 1929.                    J. L. PACKER                    1,732,984
                    LEAD OR LIKE METAL SHEATHED ELECTRIC CABLE
                         Filed Aug. 4, 1925          2 Sheets-Sheet 2

Inventor
J. L. Packer
by ____ atty.

Patented Oct. 22, 1929

1,732,984

UNITED STATES PATENT OFFICE

JOHN LEWIS PACKER, OF HUYTON, ENGLAND, ASSIGNOR TO BRITISH INSULATED CABLES LIMITED, OF PRESCOT, ENGLAND, A LIMITED LIABILITY COMPANY OF ENGLAND

LEAD OR LIKE METAL SHEATHED ELECTRIC CABLE

Application filed August 4, 1925, Serial No. 48,128, and in Great Britain November 20, 1924.

This invention has reference to electric cables, but primarily to lead or like metal covered or sheathed electric cables; and it relates more particularly to such cables, which when laid, are subject to electrolytic actions due to electric earth currents or chemical or other corrosive actions, and in which a covering or coverings of a compound or material such as a bituminous compound or material, red lead, or the like, is employed for protecting the lead or like metal sheath against such actions, such covering or coverings being enclosed with wrappings or windings of textile tape or the like, impregnated with bituminous and other waterproof or water resistant compositions, or red lead, or the like; in some cases such cables are armoured with ordinary steel or like wires or tapes.

It is found in practice that the layers or coverings of bituminous composition, red lead, or the like, which lie between the fibrous tapings or wrappings, if of a substantial thickness—which is practically necessary to achieve the end desired or very desirous— soften by the heat given off by the cable when under work, and consequently in a lead sheathed cable, the lead sheath becomes gradually eccentric to the protective coverings owing to its weight or gravity, and therefore the protective material becomes displaced, and it ceases to a large extent or wholly, to afford the protection that it otherwise would have, and is necessary; and this happens more readily when the thickness of material between the fibrous layers or wrappings is increased.

One of the chief objects and effects of this invention is to enable a relatively thick covering or coverings to be used, without the liability of de-centralization of the cable proper in relation to its protective coverings: and thereby reliably protect the cable or lead sheathing against electrolytic action, or other corrosive actions, which as stated, such cables as heretofore made are subject to.

The above ends are accomplished under this invention by furnishing outside the lead or like sheathed cable, or the armouring, a covering or coverings consisting of waterproof and insulating material of relatively great thickness—which will be covered with or enclosed in a layer or layers of impregnated tape or like wrappings or tapings, and distance pieces or devices of the thickness required, which support the wrappings or windings, and preserve or secure the concentricity of same at said distance or spacing; the spaces between the distance devices or pieces being filled with the waterproof insulating compound or covering; and thus this thick protective covering when applied (which can be done conveniently in the usual way of applying layers of such compound or material to cables) will be centrally held in the cable, and its concentricity cannot be upset. In most cases the distance pieces or devices are of insulating material or non-metallic, so that the whole protective covering is of insulating material, and electrolytic currents in the earth in which cable is laid cannot pass through the thick covering, and so cannot pass to or reach the lead like metal sheath of the cable, or armouring when it is enclosed within such a covering; nor can most chemical or corrosive media damage or destroy this covering, and reach or act upon any of the parts of the cable within this thick protective covering or coverings; and they being maintained truly concentric, and of even thickness, as described, under all circumstances, the cable remains under work continuously protected against all the above detrimental activities.

In some cases where electric cables are subject to the action of corrosive fluids or substances which destroy or deteriorate bituminous compounds or materials, red lead is used as the thick protective covering, with the distance devices; in which case the cable would not be protected against the deteriorative effects of electrolytic currents.

In some cases the thick coverings described are applied in one or more layers; and one or more of such coverings may be applied outside the lead or like sheathing or tapings. Or, again, one or more of the coverings may be used outside the armouring of an armoured cable; or the covering or coverings may be applied between the cable armouring and the lead sheathing, and also outside the armouring.

These modifications are illustrated in the annexed drawings.

A simple and economical form of distance means or device consists of one or more windings of helical form of suitable insulating material which are wound upon the tape windings or wrappings in a short pitch helix, as in a spring; and in such a case, the waterproof or preservative or protective compound or material of relatively great thickness, will be applied to the cable in the course of its manufacture, after the helical distance means has been applied. Namely, the helical spaces between convolutions of the helical distance coil or coils, are filled with the material and levelled off in usual way; and then the next tapings or wrappings wound on. These may be repeated in a plurality of annular concentric layers.

Many attempts have been made to carry out this ideal in practice, but only with partial success, by laying the cables on the so-called "solid" system. The difficulties of obtaining an entirely satisfactory installation have proved insuperable, and the use of the solid system with lead sheathed cables has fallen into disfavour, and has been almost entirely discarded in favour of cables which are protected with compound tapes (or jute) and with layers of compound.

When cables with fibrous impregnated wrappings or tapings are laid in the ground, they suffer damage by the dampness, owing to the fact that the tapes, or jute or like windings, for keeping the layers of the waterproof material in position, cannot be sufficiently saturated or impregnated with bituminous or other waterproofing or preservative mixture; and in consequence, they absorb water, or acid or alkaline solutions, which have access to them, and so such corrosive or chemical substances get access to the protective coverings, armouring wires, and to the lead, which in bad conditions results in the coverings being destroyed or penetrated, and the harmful effect of the external activities above specified, on the lead sheathing are free to follow.

When jute or like material of which the tape windings or wrappings are made is wet, it forms a conductor to electrolytic earth currents, but by the employment of the relatively thick insulation waterproof coverings produced as described, namely, by the distance devices and the thick insulated compound or material in the interspaces of same, which lies within the windings or wrappings, these currents cannot pass to or reach the lead or like sheathing at all, or the metal armouring wires or tapes which are in some cases enclosed by such a thick covering; so that by the invention, electrolytic currents, and most chemical and corrosive substances are prevented from acting harmfully on the cable.

With regard to the distance devices or means, an advantageous insulating material which can be used for this consists of a relatively hard rubber cord or wire, preferably rubber such as is used in the tread of tyres for self propelled vehicles, which besides being an insulator in itself, is not melted or detrimentally affected by the pouring or applying of the boiling or hot compound or material forming the thick covering, which is filled into the spaces between the distance devices, or means. And further, the compound or material adheres readily and closely to such rubber; and it is a material that is easily handled and applied in manufacture.

The distance device, when in the form of continuous metal wire, suitably insulated, may be adapted to serve as a pilot wire, or telephone circuit wire.

In some cases, as an alternative to the distance device material being a cord or wire of insulating material, (although this would be used in the plurality of cases), textile string or cord saturated with an insulating compound may in some cases be employed.

Or again, the distance means or devices may be of metal wire, say galvanized metal or steel wire, the surfaces of which have been provided or covered with a suitable bituminous compound or the like prior to applying it to the cable, so that it will make a firm union with the covering compound which is applied or filled into the spaces between the metal convolutions or parts, and with the saturated fibrous tapes or wrappings, which are wound round the outside of, or the outside and inside of these thick protective coverings.

With regard to the thickness of the said protective coverings, this naturally will vary under different circumstances, namely, the nature of the ground in which the cable is laid, and the degree of danger or deteriorative activities to which it may be subjected when in the ground, but in an average case the thickness may be from $\frac{1}{16}$th to $\frac{1}{8}$th of an inch.

The compound or material used in these coverings should be one that is plastic or pliable at atmospheric temperature, so that it does not crack when the cable is bent during laying or otherwise.

Figure 2:
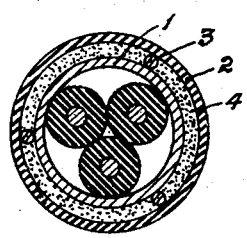

A cable of the character above described is illustrated in the accompanying drawings, in which Figure 1 is a longitudinal elevation with parts removed, showing one modification, and Figure 2 is a cross section of same.

Figures 3 and 4 and 5 and 6 are longitudinal elevations and cross sections, respectively, showing two further modifications of cables according to the invention.

Referring to the drawings, 1 in the construction shown in Figures 1 and 2 is the lead or like metal covering or sheathing of the cable; 2 are wrappings or windings of a plurality of tapes or ribbons of textile material impregnated with bituminous or other waterproof or water resistant composition, red lead, or the like; 3 are the distance devices or means, which in the cases shown consist of helically wound cords or wires; 4 is the bituminous or other covering of insulating compound or material of the character above described, or red lead constituting with the distance devices the relatively thick covering.

In the construction of cable shown in Figures 1 and 2, the insulating compound or other material 4 and distance devices 3, are applied directly to the outside of the lead or like metal sheath 1 of the cable; and outside this thick covering 3, 4, are windings or wrappings 2 of a plurality of textile tapes or ribbons impregnated with bituminous or other suitable preservative water resistant composition.

Figure 3:
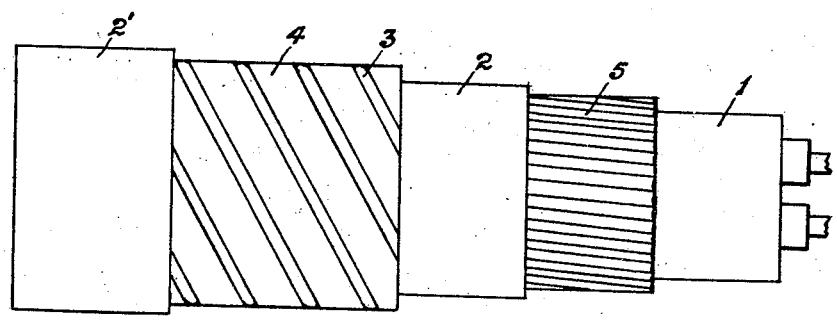
Figure 4:
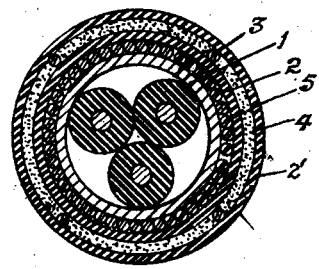

In the modification shown in Figures 3 and 4, next the lead is a covering of armouring metal wires 5 of any known suitable kind, or metal tapes or strips; and round this armouring are wrappings 2 of the impregnated textile material; and then upon this is applied the thick covering 4 of the insulating compound or other material and the distance pieces 3; and outside this are further windings or wrappings 2' of saturated textile tape.

Figure 5:
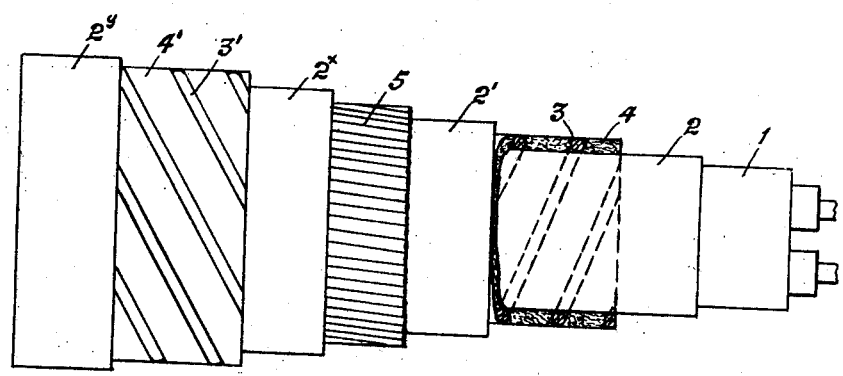
Figure 6:
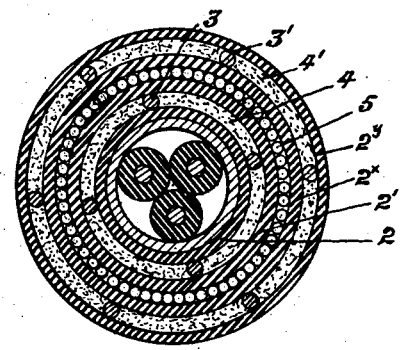

In the modification shown in Figures 5 and 6, upon the lead or like metal sheathing 1, are windings or wrappings 2 of saturated textile tapes or the like; then next over this, is the thick covering of the insulating compound 4, or material as specified, and distance devices 3; then on these are further windings or wrappings of saturated textile tape 2'; and upon this is applied the metal tape 2'; and upon this is applied the metal armouring 5, outside which further windings 2ˣ of saturated textile tapes are applied; and again round this is another thick covering of insulating compound 4' and distance devices 3', outside which further wrappings or windings 2ʸ of saturated textile tapes are applied.

As regards these various coverings and parts forming the cable, these may be varied in making the cable according to the conditions under which the cable is to work; and the number and thicknesses of the different coverings or parts may also similarly be varied.

In the drawings, the form of the distance pieces is a plurality of helically wound cords or wires 3 of relatively short pitch, in the relatively wide helical spaces between the convolutions of which is filled the bituminous or other insulating waterproof compound, or material as specified.

The distance pieces 3, over which the textile or like windings 2, are applied as described, and by which such windings and the compound or material 4 are supported and held concentrically in the cable, may take different forms, but those above described in connection with drawings are advantageous, being simple and quickly and easily applied in manufacture.

As above stated when the devices 3 are of metal wire, say galvanized iron or steel, their surface, prior to application, should be covered with a suitable bituminous or like compound, so that when the covering compound 4 is applied to the cable, it will make a complete and firm union with the wires.

What is claimed is:—

1. In an electric cable having an inner insulated conductor part surrounded by metal, a protective covering adapted to protect said metal against electrolytic action and chemical or other corrosive action, comprising a waterproof insulating material having within it distance devices, such material and distance devices being enclosed within wrappings of textile material impregnated with preserving material, and the said distance devices being adapted to support the wrappings and maintain the concentricity and constant thickness of such waterproof insulating material in relation to the said surrounding metal.

2. An electric cable comprising a central portion containing the conductor or conductors, a lead sheathing enclosing same, a relatively thick covering of insulating waterproof material having within it distance devices and wrappings of textile material outside said covering, said distance devices being adapted to support said wrappings.

3. An electric cable comprising a central portion containing an insulated conductor, metal armor around said central portion, a relatively thick covering of waterproof insulation material around said armor having within it distance devices, wrappings of textile material impregnated with preserving material, enclosing the said waterproof material, said distance devices supporting the wrappings concentrically to the conductor portion of the cable.

4. An electric cable comprising a central portion containing a conductor, a soft metal sheath outside same, metal armoring outside the metal sheath, wrappings of textile material impregnated with preserving material outside said armoring, a thick covering around said armoring consisting of insulating waterproof material, having within it a distance piece, and wrappings of textile material impregnated with preserving material surrounding said latter covering, and supported concentrically by the distance devices thereof.

5. An electric cable comprising an inner part containing the conductor or conductors, a covering adapted to protect metal parts of the cable against electrolytic action and chemical or other corrosive action, comprising a waterproof insulation material having within it distance devices adapted to maintain the concentricity and constant thickness of such waterproof insulating material in relation to the parts of the cable enclosed within it, wrappings of textile material round said covering, metal armouring, and outside said armouring a relatively thick covering of insulation waterproof material having within it distance devices and wrappings of textile material round the latter thick covering supported by the said distance devices.

In testimony whereof I have signed my name to this specification.

JOHN LEWIS PACKER.